Feb. 14, 1956        H. RABEZZANA        2,734,693
SPINNING REEL

Filed April 25, 1950        4 Sheets-Sheet 1

INVENTOR.
Hector Rabezzana
BY
Harness, Dickey & Pierce
ATTORNEYS.

Feb. 14, 1956  H. RABEZZANA  2,734,693
SPINNING REEL
Filed April 25, 1950  4 Sheets-Sheet 2

INVENTOR.
Hector Rabezzana
BY
Harness, Dickey & Pierce
ATTORNEYS.

United States Patent Office 2,734,693
Patented Feb. 14, 1956

2,734,693

SPINNING REEL

Hector Rabezzana, Fenton, Mich.

Application April 25, 1950, Serial No. 157,896

18 Claims. (Cl. 242—84.4)

The present invention relates to an improved fishing reel and more particularly to an improved fishing reel of the type generally known as spinning reels.

It is an object of the present invention to provide an improved spinning type fishing reel which is simple in construction, economical of manufacture, of durable construction and reliable and efficient in operation.

A further object of the present invention is to provide an improved spinning type fishing reel which may be readily adapted for either right or left hand operation.

A further object of the invention is to provide an improved spinning type fishing reel incorporating improved simplified means for preventing rotation of the shaft upon which the spool is carried.

It is also an object of the present invention to provide an improved spinning type fishing reel having a loop and a spring yeldably holding the loop in its closed or winding position which spring is disengaged from the loop upon movement of the latter out of the closed position and in which the loop is positively engaged at all times when out of the closed position whereby rotation of the handle of the reel in a winding direction will immediately effect pivotal movement of the loop to the closed or winding position.

Another object of the invention is to provide an improved spinning type fishing reel in which the loop is yieldably held in its closed position by means which is disengaged when the loop is pivoted from the closed position, thereby preventing this means for causing any drag interfering with pivotal movement of the loop.

It is also an object of the invention to provide an improved spinning type fishing reel including a stationary circular gear adapted to co-operate with means on the loop for pivoting the loop from its open to its closed position, the gear having a circular outer peripheral edge whereby the possibility of tangling of the line in the gear is minimized.

Another object of the invention is to provide an improved spinning type fishing reel including improved means for limiting the pivotal movement of the loop at its open and closed positions.

Other and more detailed objects of the invention will become apparent from a consideration of the following specification, the appended claims, and the accompanying drawings, throughout the several views of which like reference characters designate like parts and wherein:

Figure 10 is a broken elevational view showing the loop in the open position;

Figure 11 is an enlarged broken sectional view of the structure illustrated in Figure 2, taken substantially along the line 11—11 thereof;

Figure 12 is a broken enlarged sectional view of the structure illustrated in Figure 6, taken substantially along the line 12—12 thereof;

Figure 13 is a broken elevational view showing the opposite side of the reel from that illustrated in Figure 10; and, Figure 14 is a broken elevational view showing a modified form of the invention.

Referring to the drawings, the spinning reel of the present invention generally comprises a stationary part generally indicated at 20 which rotatably supports a crank shaft 22 projecting from one side thereof and provided with a crank 24, and also supports a spool shaft 26 for sliding movement along its axis, a spool 28 mounted on the shaft 26, a rotor 30 rotatable about the shaft 26 and spool 28 and carrying a loop assembly 32 mounted for pivotal movement between an open or casting position and a closed or winding position, drive means connecting the crank 24 to the spool shaft 26 for imparting reciprocatory axial movement to the shaft 26 and connected to the rotor 30 for rotating it about the spool 28 and spool shaft 26, and a bracket 34 for mounting the reel on a rod illustrated in broken lines at 36.

It will be appreciated from a complete understanding of the present invention that the improved spinning type fishing reel thereof may be formed of any suitable material, the various parts thereof being shaped in any suitable manner and the reel being fabricated in any suitable manner. While it will be appreciated that in the broader aspects of the present invention certain of the reel components may be made of die castings, for example, in the preferred embodiment illustrated and described herein, the reel is formed primarily of stampings and screw machine parts.

Considering the above generally mentioned elements in greater detail, the stationary part 20 includes a generally flat circular housing 38 which, in the preferred embodiment illustrated, is made of two stampings 40 and 42, which are crimped together as illustrated at 44, thereby eliminating the use of screws in assembly of the housing 38. The stationary part 20 also includes a bearing member 46, to one end of which the housing 38 is connected for rotation relative thereto, as indicated at 48, and a large circular gear 50 which is crimped to the other end of the bearing member 46 as indicated at 52. The housing stamping 40 carries a sleeve member 54 crimped thereto as indicated at 56 and in which the crankshaft 22 is journaled. The sleeve member 54 is disposed centrally of the housing 38 and extends outwardly from one side thereof.

In the embodiment illustrated in Figures 1 to 13, inclusive, the bracket 34 has its inner end secured by a rivet 58 to the gear 50 and in spaced relation to its inner end, the bracket 34 is secured by a screw 60 to an edge portion of the housing 38. It will thus be appreciated that the bracket 34 provides a connection between the housing 38 and the gear 50 fixing them in the desired relative rotative position.

The housing 38 is also provided with a second screw 62 adapted to secure the bracket 34 to the housing 38 when the housing 38 is rotated 180° relative to the gear 50 from the position illustrated in the drawings. It will be appreciated that the provision of the two screws 60 and 62, permitting the housing 38 to be secured to the gear 50 in either of two positions, permits the reel to be readily adapted for either right or left hand operation, as desired.

In the preferred embodiment illustrated, the rod bracket 34 is a stamping and carries a base member 64 which is a separate stamping and is secured to the outer end of the rod bracket 34 by rivets 66. It has been found that the main portion of the rod bracket 34 should extend at an angle of 40° to 50° to the axis of the spool 28 and that the base 64, which is adapted to fit and be secured to the rod 36, should be disposed at an angle of 3° to 9° relative to the axis of the spool 28, to insure proper clearance and alignment during operation of the reel.

Within the housing 38, the shaft 22 is provided with an annular collar 66 adapted to engage the inner end of the sleeve member 54 to hold the shaft 22 against axial movement in one direction. Axial movement of the shaft 22 in the opposite direction is limited by the engagement of a hub 68, hereinafter described in greater detail, with the outer end of the sleeve member 54. The hub 68 is fixed to the inner end of the crank 24 and is threaded on a stud portion 70 at the outer end of the shaft 22. By virtue of this threaded engagement of the hub 68 on the stud portion 70, it will be appreciated that the crank 24 may be readily removed to facilitate storage of the reel. The shaft 22 carries a gear 72 disposed inwardly of and immediately adjacent the collar 66. A spacer 74 is received on the shaft 22 inwardly of the gear 72 and a cup-shaped cam 76 is received on the shaft 22 adjacent the spacer 74. A shaft portion indicated at 78 is crimped against the cam 76 to grip the cam 76, the spacer 74 and the gear 72 between the collar 66 and the crimped portion 78. The cam 76 may be formed of a stamping and has an annular flange 80 having a cylindrical outer cam surface which is eccentric relative to the crankshaft 22.

Figures 3, 4, 5:
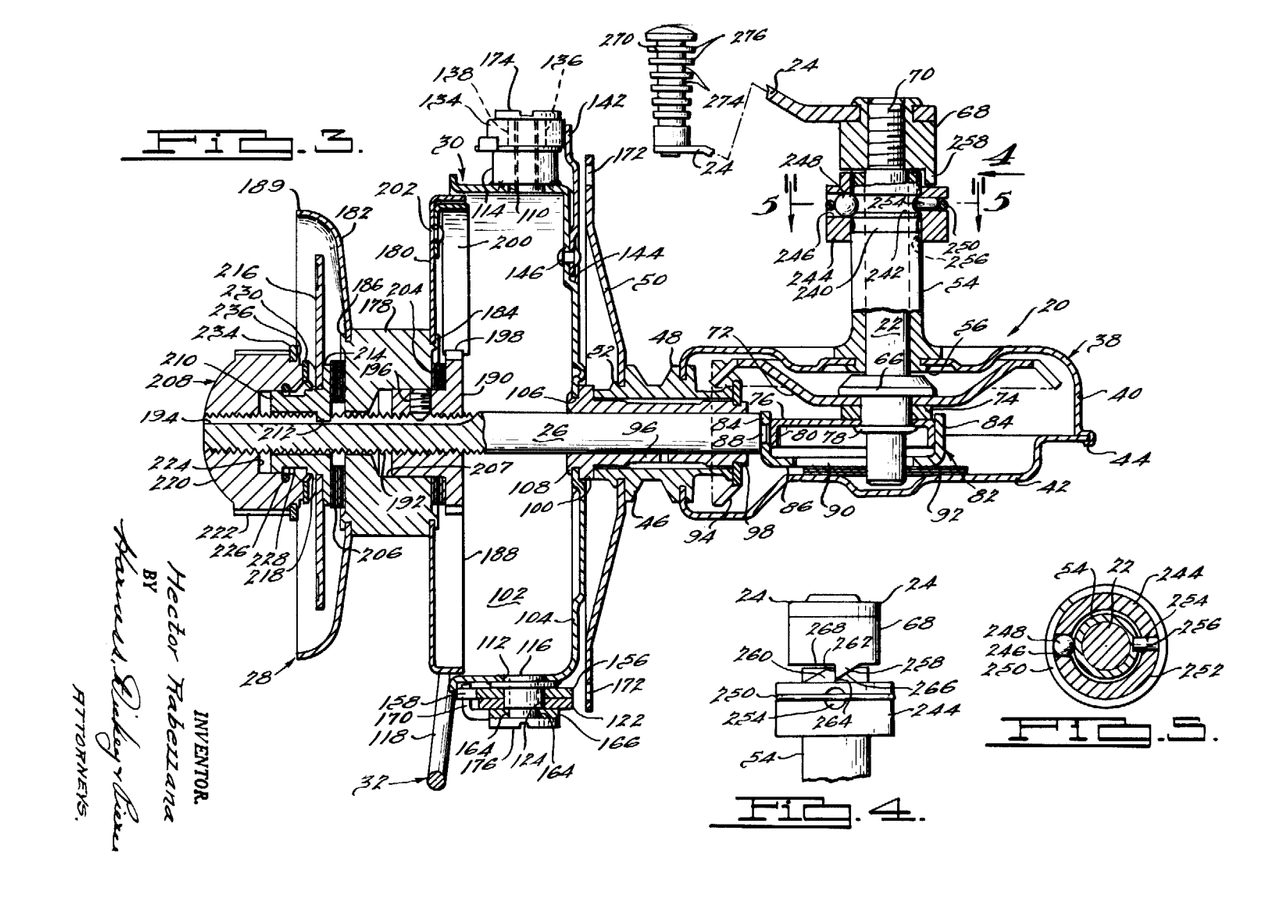
Figure 3 is an enlarged broken sectional view of the structure illustrated in Figure 2, taken substantially along the line 3—3 thereof.
Figure 4 is a broken elevational view of the structure illustrated in Figure 3, looking in the direction of the arrow 4 therein.
Figure 5 is a sectional view of the structure illustrated in Figure 3, taken substantially along the line 5—5 thereof.
Figure 7:
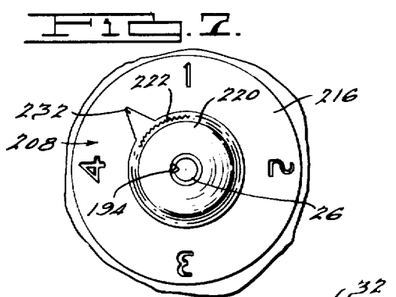
Figure 7 is an elevational view of the structure illustrated in Figure 2, taken from the line 7—7 thereof.
Figure 8:
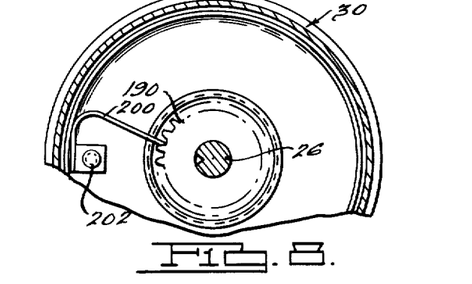
Figure 8 is a broken sectional view of the structure illustrated in Figure 2, taken substantially along the line 8—8 thereof.

A generally U-shaped cam follower 82, having leg portions 84 and a body portion 86, is secured to the inner end of the spool shaft 26 and constitutes an axial extension of the spool shaft 26. In the embodiment illustrated, the cam follower 82 is secured to the spool shaft 26 by providing an aperture in one of the legs 84 which receives a reduced inner end portion 88 of the shaft 26, which is secured to the cam follower 82 in a suitable manner, such as peening over the end of the shaft or by brazing. The leg portions 84 are spaced to closely fit over the opposite sides of the cam 76 so that rotation of the crankshaft 22, by means of the crank 24, operates through the coaction of the cam 76 and the cam follower 82 to effect reciprocatory axial movement of the spool shaft 26. The cam follower 82 is provided with an elongated aperture 90 in the body portion 86 and extending axially of the spool shaft 26. The inner end portion of the crankshaft 22 extends through the elongated aperture 90 in the cam follower and carries a suitable washer 92 which fills the space between the body portion 86 of the cam follower 82 and the adjacent inner surface of the housing stamping 42. As is best seen in Figures 3 and 7, the body portion 86 of the cam follower 82 has a flat outer surface which extends parallel to the adjacent inner surface of the housing stamping 42 and this flat outer surface slides over the washer 92 and its engagement with the washer 92 prevents rotation of the shaft 26.

In the preferred embodiment illustrated, the gear 72 is a stamping and is suitably hardened. A pinion gear 94, which is also a stamping and suitably hardened, is mounted on the inner end of a tubular shaft 96 journaled in the bearing 46 and secured thereto for rotation therewith by crimping a portion of the shaft 96 over the gear as illustrated at 98. The pinion gear 94 meshes with the large gear 72 carried by the crank shaft 22 and may be so proportioned relative thereto as to provide any desired drive ratio therebetween. In the illustrated construction, the ratio of these gears is two and one-half to one, which means that for each revolution of the crank 24, the rotor 30 makes two and one-half revolutions. As is clearly illustrated in Figure 3, the gears 72 and 94 are formed with their teeth inclined relative to the axis of rotation of the gears and the gears are supported on the shafts 22 and 96 so disposed that the engaging teeth of the gears 72 and 94 are disposed substantially at right angles to each other at the point of engagement. As a result of this relation, the engagement of the gear teeth does not force the lubricant from the teeth.

The tubular shaft 96 has a collar 100 adjacent its outer end which engages the outer end of the bearing 46 to prevent axial movement of the shaft 96 relative to the bearing 46 in one direction and movement in the opposite direction is prevented by engagement of the gear 94 radially inwardly of the gear teeth thereon, with the inner end of the bearing 46.

The rotor 30 is generally cup-shaped including a cylindrical side wall 102 and a generally flat bottom 104, which has a centrally disposed aperture 106. The rotor 30 is mounted on the outer end of the tubular shaft 96, the outer end portion of which projects through the aperture 106 in the bottom of the rotor and is crimped over the inner side of the rotor bottom 104, as indicated at 108.

In the preferred embodiment illustrated, the rotor 30 is also a stamping and has apertures 110 and 112 at diametrically opposite sides of the cylindrical wall 102 in which are mounted generally cylindrical bosses 114 and 116 which are suitably secured thereto as by brazing.

Figure 6:
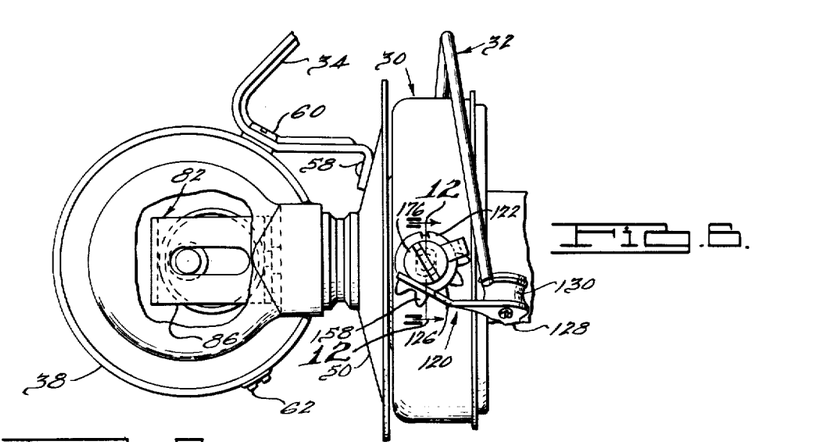
Figure 6 is a broken enlarged elevational view of the structure illustrated in Figure 1, showing the opposite side of the reel from that illustrated in Figure 2.
Figure 9:
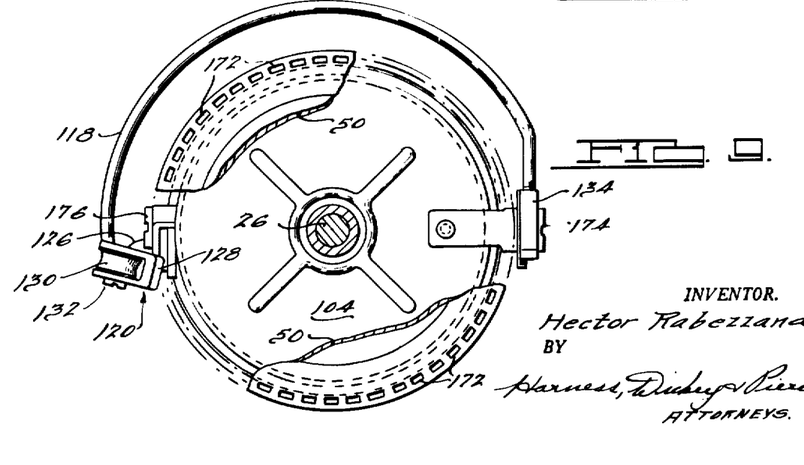
Figure 9 is a broken sectional view of the structure illustrated in Figure 2, taken substantially along the line 9—9 thereof.
Figures 10, 11, 12, 13, 14:
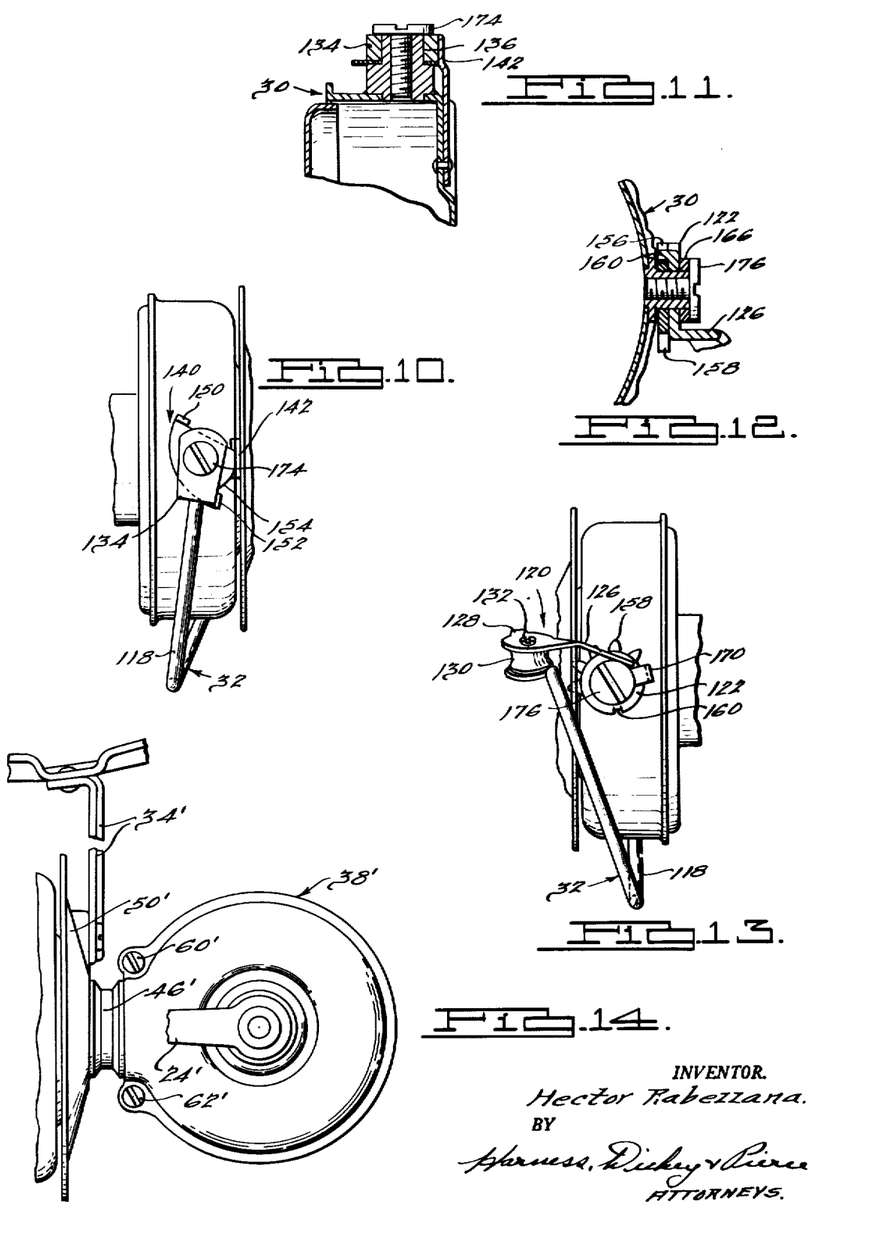

The loop assembly 32 includes a generally semicircular wire 118, one end of which is welded or otherwise suitably secured to a stamping 120 which is best illustrated in Figures 6, 9 and 13 and includes a flat portion 122 having a central aperture 124 in which the trunnion 116 is received to pivotally mount the stamping 120 thereon. The stamping 120 includes an arm portion 126 integral with the flat portion 122 and so formed that when the loop 32 is in the closed position, it extends generally axially outwardly of the spool shaft 26 and terminates at its outer end in a U-shaped portion 128, best shown in Figure 9. This U-shaped portion 128 is disposed with the open end presenting outwardly and carries a roller 130 rotatably supported on a screw 132 which extends through one leg of the U and threadedly engages the other end. In addition to providing a support for the roller 130, the screw 132 may be adjusted to provide the proper spacing between the legs of the U-shaped portion 128 so that the clearance between the ends of the roller 130 and the legs of the U-shaped portion may be accurately adjusted to permit free rotation of the roller 130 and at the same time prevent fouling of the line between the ends of the roller and the legs of the U-shaped portion 128 of the stamping 120.

Figure 2:
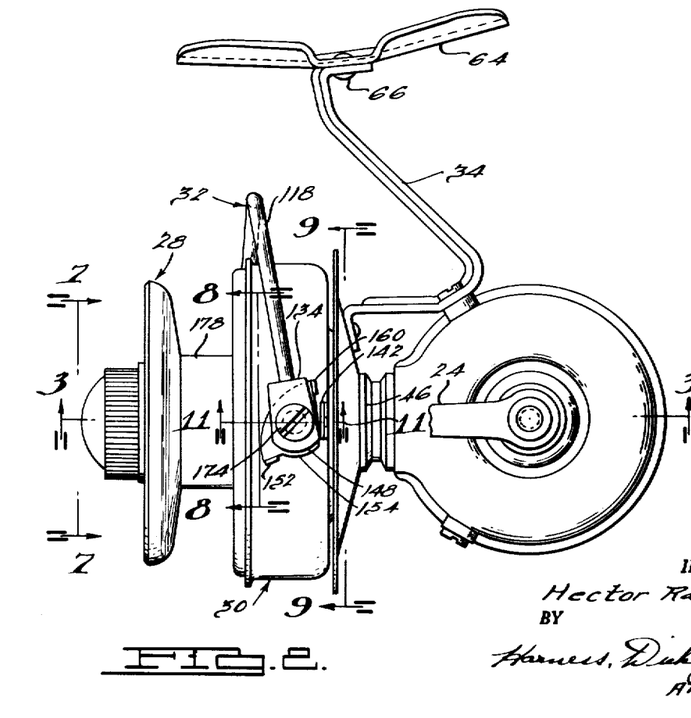
Figure 2 is an enlarged elevational view of the structure illustrated in Figure 1.

At its opposite end, the wire 118 is threaded into a cam member 134 having an aperture 136 which fits over a reduced outer end portion 138 of the trunnion 114. Also rotatably mounted on the outer trunnion portion 138, and disposed inwardly of the cam member 134, is a stamping 140. The cam member 134 and the stamping 140 coact with a flat leaf type spring 142 which is mounted in a recess indicated at 144 (see Figure 3) formed in the bottom 104 of the rotor 30 at the outer side of the cup-shaped rotor. The inner end of the spring 142 is secured to the bottom 104 of the rotor by the rivet 146. The spring 142 extends generaly parallel to the rotor trunnion 114 in spaced relation thereto and its outer end portion is disposed to engage the cam member 134 to yieldably hold the loop 32 in the closed position, as illustrated in Figure 2. The cam member 134 has a cam surface 148 which acts to depress the outer end of the spring 142 upon rotation of the loop 32 from its closed to its open position. The stamping 140 is provided with outwardly turned ears 150 and 152 disposed to be engaged by the cam member 134 during pivotal movement about the trunnion portion 138. These projections are angularly spaced, as illustrated in Figures 2 and 10, to provide a lost motion connection between the cam member 134 and the stamping 140. The stamping 140 also is formed to provide a cam surface 154 adapted to engage the outer end of the spring 142 and hold the latter out of engagement with the cam member 134, as illustrated in Figure 10. It will be noted that, as is clearly shown in Figure 2, the cam surface 154 is disposed radially outwardly of the cam surface 148 on the cam member 134 so that so long as the spring 142 is engaged by the cam surface 154 of the stamping 140, the spring 142 is held out of engagement with the cam member 134 and the latter is free to pivot about the trunnion portion 138. The cam member 134 and the stamping 140 are so proportioned that during pivotal movement of the loop 32 from the open position illustrated in Figure 10, to the closed position illustrated in Figure 2, the cam surface 154 of the stamping 140 remains in engagement with the outer end of the spring 142 until this pivotal movement toward the closed position is substantially completed. As the loop approaches the closed position, the stamping 140 and the cam member 134 snap into the position illustrated in Figure 2, in which the spring 142 engages the cam member 134 at one end of the cam surface 148 and yieldably holds the loop in the closed position.

Figure 1:
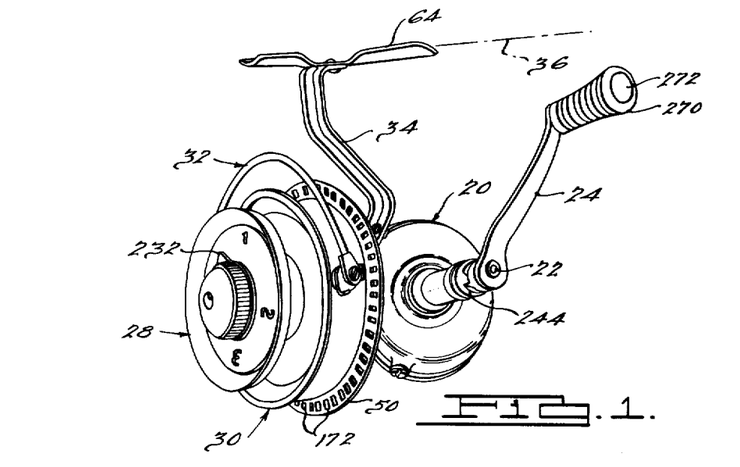
Figure 1 is a perspective view of a spinning type fishing reel embodying the invention and illustrating the loop in the closed position.

The loop 32 is driven from its open to its closed position through a gear sector 156 (see Figure 3) which carries a plurality of gear teeth 158 adapted to mesh with the above mentioned large gear 50 carried by the bearing member 46. The gear sector 156 is pivotally mounted on the trunnion 116 on the rotor 30 and is connected to the stamping 120 for rotation therewith by a detent 160 projecting inwardly from the flat portion 122 of the stamping 120 and received in a co-operating notch 162 provided in the gear sector 156. Adjacent its outer end, the trunnion 116 is provided with a pair of diametrically opposed flats 164. A stop 166 has a central aperture 168 and is adapted to fit over the outer end portion of the trunnion 116 and engage the flats 164 thereon to prevent pivotal movement of the stop 166 about the trunnion 116. The stop 166 has a finger portion 170 which extends axially inwardly of the trunnion 116 and is disposed in the path of movement of the teeth 158 on the gear sector 156 and in the path of movement of the arm 126 of the stamping 120. The open position of the loop 32 is determined by the engagement of the arm 126 of the stamping 120 with one side of the stop finger 170, and the closed postion of the loop 32 is determined by the engagement of an end tooth 158 of the gear sector 156 with the opposite side of the stop finger 170. The gear 50 has a plurality of apertures 172 disposed in spaced relation to the outer periphery of the gear 50 and equiangularly spaced about the gear 50, as best illustrated in Figures 1 and 9. The teeth 158 of the gear sector 156 engage in the apertures 172 when the loop 32 is moved from the closed position, independently of the position of the rotor 30. By forming the gear 50 in this manner, it may have a smooth circular peripheral edge, thereby reducing the likelihood of things becoming caught on it. In the preferred embodiment illustrated, the gear sector 156 is so proportioned relative to the stamping 140, above described, that, during pivotal movement of the loop 32 from the closed to the open position, the spring 142 is moved out of engagement with the cam member 134 just after the teeth 158 are moved out of engagement with the gear 50 and upon movement of the loop 32 from the open to the closed position, the cam surface 154 is moved clear of the spring 142, permitting it to again engage the cam member 134 just before the teeth 158 are moved out of engagement with the gear 50.

To facilitate servicing of the reel, the above described assemblies at the opposite ends of the loop 32 are held in the above described assembled relation on the trunnions 114 and 116 by screws 174 and 176, which are threaded into tapped openings extending axially inwardly of the trunnions.

The spool 28 comprises a hub portion 178 and axially inner and outer walls 180 and 182 which are formed of stampings and are secured to the hub 178, at its axially inner and outer ends, by crimping as indicated at 184 and 186, respectively. The axially inner wall 180 of the spool 28 terminates at its outer periphery in an axially inwardly extending flange 188 which is adapted to overlap the cylindrical wall 102 of the rotor 30 in all positions of the spool 28 which, it will be appreciated from a complete understanding of the invention, moves axially of the rotor 30. The outer wall 182 of the spool 28 has its radially outer portion outwardly flared as indicated at 189 (see Figure 3) to provide a smoothly curved surface over which the line (not shown) may run out when the loop 32 is in the open position.

The spool 28 is carried on the spool shaft 26 and supported against axial movement relative thereto in one direction by an adjustable element 190 mounted on the shaft 26. A substantial length of the spool shaft 26, extending inwardly from its outer end, is threaded as indicated at 192 and provided with an axially extending slot 194. The element 190 is internally threaded for threaded engagement with the shaft 26 and carries a set screw 196 projecting into the slot 194 and locking the element 190 in adjusted position. At its inner end the element 190 has a ratchet wheel 198 integrally formed thereon which is engaged by a spring 200 mounted on the axially inner wall 180 of the spool 28 and secured thereto by a rivet 202. The spring 200 and the ratchet wheel 198 cooperate to provide an audible signal indicating rotation of the spool relative to the spool shaft 26. Axially outwardly of the ratchet wheel 198, the element 190 is generally cylindrical and projects into a recess 207 extending axially of the spool hub 178 from its axially inner end. The element 190 carries a washer 204 which may be cemented or otherwise secured on the axially outer face of the ratchet wheel 198 and is adapted to engage the axially inner face of the hub 178 of the spool 28. The washer 204, in the preferred embodiment illustrated, is formed of a felt material and a similar washer 206 is secured to the axially outer face of the hub 178.

An adjustable pressure nut assembly, generally indicated at 208, is mounted on the outer end of the spool shaft 26 for providing an adjustable frictional load acting to prevent rotation of the spool 28 relative to the spool shaft 26. This pressure nut assembly 208 comprises an axially inner sleeve member 210 slidable over the spool shaft 26 and having a radially inwardly extending projection 212 projecting into the slot 194 and preventing rotation of the sleeve member 210 relative to the spool shaft 26. At its inner end the sleeve member 210 has a radially outwardly extending flange 214, the axially inward surface of which engages the outer face of the above described felt washer 204. Adjacent and outwardly of the flange 214, the sleeve member 210 carries an annular plate 216 over which a portion of the sleeve member 210 is crimped, as indicated at 218, to prevent rotation of the plate 216 relative to the sleeve member 210. The pressure nut assembly 208 also includes a nut 220 having a threaded engagement with the spool shaft 26 and having a knurled outer peripheral surface 222 permitting the nut 220 to be readily rotated manually relative to the spool shaft 26. At its inner side, the nut 220 has an axially extending recess 224 adapted to receive the sleeve member 210. The nut 220 carries a split lock washer 226 imbedded in the wall of the recess 224 and adapted to project into an axially extending annular groove 228 formed in the outer surface of the sleeve member 210 to provide a lost motion connection between the sleeve member 210 and the nut 220, permitting limited relative axial movement therebetween. An annular wavy spring 230 is disposed between the outer surface of the plate 216 carried by the sleeve member 210 and the inner end surface of the nut 208.

From the foregoing description it will now be appreciated that as the nut 220 is threaded along the spool shaft 26 toward the spool 28, the loading of the spring 230 is progressively increased and accordingly the pressure between the inner face of the flange 214 and the washer 206 is increased because of the increased loading of the spring 230. In the preferred embodiment illustrated, the nut 220 carries a pointer 232 (see Figures 1 and 7) which is formed on a generally annular plate 234 mounted adjacent the inner end of the nut 220 and secured in place by the crimping indicated at 236 (see Figure 3). Also, the plate 216 is provided with suitable indicia, such as the numerals 1, 2, 3 and 4 illustrated in Figures 1 and 7, which co-operate with the pointer 232 for indicating changes in the loading of the spring 230.

Referring now to Figures 3, 4 and 5, the present invention also contemplates the provision of means for positively preventing rotation of the crank 24 in an unwinding direction. The purpose of the provision of such means will be readily understood when it is considered that it is possible in some constructions, depending upon the construction of the loop mechanism 32 and the gear ratio of the gears 94 and 72, that in use a pull on the line may exert a force tending to move the rotor in an unwinding direction. Any such movement of the rotor would, of course, be transmitted to the crank 24 and the provision of means positively preventing such rotation of the crank would, therefore, positively hold the rotor against movement in an unwinding direction. In the preferred embodiment illustrated in the drawings, the sleeve member 54 is provided with a pair of annular grooves 240 and 242 formed in the outer surface and spaced inwardly of its outer end. A collar 244 is mounted on the sleeve member 54 and has a radially extending aperture 246 in which is mounted a ball 248 urged inwardly against the sleeve member 54 by a split wire spring 250 disposed in an annular groove 252 formed in the outer surface of the collar 244 and communicating with the aperture 246. At the opposite side of the collar 244 from the aperture 246, is a pin 254 which projects into an axially extending slot 256 formed in the outer surface of the sleeve member 54. The pin 254, by its engagement in the slot 256, prevents rotation of the collar 244 relative to the sleeve member 54. Referring to Figure 4, the hub 68 secured to the inner end of the crank 24, and the collar 244 have integrally formed co-operating teeth 258 and 260 respectively. These teeth are so proportioned that when the collar 244 is disposed in the position illustrated in the drawings, in which the ball 248 is engaged in the annular groove 242, the tooth 260 of the collar 244 is disposed in the path of movement of the tooth 258 on the crank hub 68. The teeth 258 and 260 have co-operating faces 262 and 264 respectively, adapted to engage and prevent movement of the crank 24 in an unwinding or clockwise direction, as viewed in Figures 1 and 2. These teeth are also provided with sloping surfaces 266 and 268, respectively, adapted to engage upon movement of the crank 24 in a winding or counterclockwise direction, as viewed in Figures 1 and 2, to cam the collar 244 axially along the sleeve member 54 from the position illustrated in the drawings to a position in which the tooth 260 thereof is out of the path of movement of the tooth 258 on the crank hub 68. This results in the movement of the ball 248 from the annular groove 242 to a position approaching alignment with the groove 240. The action of the wire spring 250, urging the ball inwardly, causes the collar 244 to continue its axial movement until the ball 248 is fully aligned with and seated in the groove 240. The result is that the tooth 260 on the collar 244 is well out of the path of movement of the tooth 258 on the crank hub 68. From the foregoing it will be appreciated that when the fisherman desires to lock the crank 24 against movement in an unwinding direction, it is necessary for him only to move the collar 244 outwardly to the position illustrated in the drawings, in which the ball 248 is seated in the groove 242. While this construction prevents rotation of the crank in an unwinding direction, it is not necessary that any adjustment be made by the fisherman prior to beginning a winding movement of the crank 24, since such winding movement automatically moves the collar 244 out of the locking position illustrated, to the above described position in which the ball 248 is seated in the groove 240.

Referring to Figures 1 and 3, the applicant provides an improved handle 270 at the outer end of the crank 24 which is rotatably mounted on a pin 272 extending generally at right angles to the crank 24 and suitably secured thereto. The handle 270 is generally conical in shape and has a plurality of equally axially spaced grooves 274 which define, intermediate the grooves 274, a plurality of flange portions 276 having abrupt edges which facilitate gripping of the handle 270 by the fingers and tend to prevent the fisherman's grip of the handle 270 from slipping.

It will be appreciated from the foregoing description that the applicant has provided an improved construction which may be very economically manufactured. For example, by constructing the spinning reel as above described, the applicant provides a reel including a gear housing 38 formed of a cup-shaped stamping 40 carrying a crankshaft bearing sleeve 54, and a second stamping 42 co-operating with the cup-shaped stamping 40 to support a second bearing sleeve 46 and permit rotation of said housing 38 relative thereto, a rotor stamping 102 carried on a tubular shaft 96 journaled in the bearing sleeve 46, and a stationary gear mounted on the bearing sleeve 46 which co-operates with the loop assembly 32 as above described and all of which are secured in assembled relation without the use of screws. Also, in the improved reel of the present invention, rotation of the rotor 30 and reciprocation of the spool shaft 26 is effected by a drive unit comprising the crankshaft 22, the gear stamping 72 and the eccentric cam stamping 76, both of which are secured to the shaft 22 for rotation therewith by a single crimping operation. Throughout the present improved reel the applicant has provided a construction which is extremely economical of manufacture and at the same time is durable and the operation of which is reliable, efficient, and convenient.

It is believed that the operation of the present reel is readily apparent to one skilled in the art, from the foregoing description of the reel's construction. However, to insure a complete understanding of its operation, a brief statement thereof follows.

The reel is mounted on the rod 36 in the position illustrated in Figure 1. The line (not shown in the drawings) is wound about the hub portion 178 of the spool 28 with the loop 32 in the open position illustrated in Figures 6 and 10, the end of the line is threaded through the eyelets provided on the rod and connected to a suitable lure. In casting, the fisherman grasps the line adjacent the reel and holds it against the rod with one finger of the same hand in which he holds the rod and reel and moves the loop 32 to the open position with the other hand. At the proper point during the cast, the line is released and it is pulled axially off the spool 28 over the outwardly flared portion 189 of the axially outer plate 182 of the spool, by the kinetic energy of the lure. During the cast, the spool 28 remains stationary as in all conventional spinning type fishing reels. When it is desired to reel in the line, the fishermen grasps the handle 270 with his free hand and turns it in a winding direction. It will be noted here that when the loop 32 is in the open position, rotation of the crank 24 in an unwinding direction is prevented by the engagement of the teeth 158 of the gear sector 156 with the teeth 172 of the gear 50 and the abutment of the arm 126 of the stamping 120 with the finger 170 on the stop 166. Accordingly, the only direction in which the crank 24 may be rotated when the loop 32 is in the open position, is in a winding direction. It will be appreciated that this prevents inadvertent winding in the wrong direction and consequent loss of what may be valuable time in initiating the winding in of the line. Immediately upon movement of the crank 24 in a winding direction, the rotation of the rotor causes the gear sector to pivot about the trunnion 116, because of the engagement of the gear sector 156 with the stationary gear 50. This pivotal movement of the gear sector 156 effects a simultaneous corresponding movement of the stamping 120 connected thereto by the detent 160. This pivotal movement of the stamping 120 effects pivotal movement of the entire loop assembly 32 toward the closed position, during the major portion of which, as above described, the spring 142 is held out of engagement with the cam member 134 by the stamping 140. The movement of the loop assembly to the closed position and the resulting rotation of the rotor 30 causes the line to assume a position in which it is trained over the roller 130. It will be noted that, as illustrated in Figure 6, pulling on the line, when the loop 32 is in the closed position the line is trained over the roller 130, will tend to hold the loop 32 in the closed position rather than move it to the open position.

From the foregoing it will be appreciated that the fisherman may adjust the pressure applying nut or brake 208 to vary the frictional force resisting rotation of the spool. When the force transmitted to the spool through the pull on the line exceeds this friction force, the spool 28 rotates relative to the spool shaft 26.

In its broader aspects the present invention contemplates that provision for left or right hand operation may be made either by providing for rotation of the housing relative to the stationary gear means or by having the housing and stationary gear means in fixed relation and simply connecting the rod bracket in either of two positions spaced 180° apart. Referring to Figure 14, in the modification there illustrated the bracket 34' is connected only to the stationary gear 50' and the stampings forming the housing 38' are clamped to the bearing shaft 46' by screws 60' and 62'. The housing 38' may be rotated relative to the bracket 34' fixed to the gear 50' by loosening the screws 60' and 62' and rotating the housing 38' on the bearing shaft 46' to the desired position and again tightening the screws 60' and 62'.

While only two specific embodiments of the invention have been illustrated and described in detail herein, it will be readily appreciated by those skilled in the art that numerous modifications and changes may be made without departing from the spirit of the present invention.

What is claimed is:

1. A spinning type fishing reel including first and second members, a crank mounted on one of said members, means connecting said members for rotation relative to each other between first and second positions for positioning said crank at the right or left side of the reel, a bracket secured to one of said members and adapted to be secured to a fishing rod, and means for selectively securing said bracket to the other of said members to selectively secure said members in said positions.

2. A spinning type fishing reel comprising a housing, a crankshaft and a spool shaft extending into said housing at substantially right angles to each other, means supporting said crankshaft for rotation about its own axis, means supporting said spool shaft for movement along its own axis, said housing having a bearing surface extending parallel to the axis of said spool shaft, a cam secured to said crankshaft in spaced relation to its inner end, a co-operating cam follower secured to said spool shaft and having a body portion having an elongated aperture receiving said crankshaft therethrough, and a washer supported on said crankshaft intermediate said cam follower and said bearing surface of said housing and co-operating with said bearing surface of said housing and said body portion of said cam follower to prevent rotation of said spool shaft.

3. A spinning type fishing reel comprising a rotor, a loop pivotally mounted on said rotor for movement between an open and a closed position, a cam member connected to one end of said loop and pivotally mounted on said rotor, a spring mounted on said rotor and adapted to engage said cam member to yieldably hold said loop in said closed position, and a cam plate pivotally mounted on said rotor and having a cam surface adapted, in one position of said cam plate to hold said spring out of engagement with said cam member, said cam plate having a first projection adapted to be engaged by said cam member during pivotal movement of said loop from said closed to said open position to pivot said cam plate to said one position and said cam plate having a second projection adapted to be engaged by said cam member during movement of said loop from said open position to said closed position to pivot said cam plate to another position in which said cam surface of said cam plate is clear of said spring.

4. A spinning type fishing reel as defined in claim 3 wherein said projections are spaced apart to provide a lost motion connection between said cam member and said cam plate, whereby upon pivotal movement of said loop from said open position to said closed position, said cam plate is not moved from said one position to said another position until said loop is approaching said closed position.

5. A spinning type fishing reel as defined in claim 3 wherein said rotor is generally cup-shaped including a cylindrical side wall upon which said loop is pivotally mounted and a bottom having a recess in its outer surface, and said spring is a flat leaf spring mounted in said recess and projecting radially outwardly for engaging said cam member and said cam surface of said cam plate.

6. A spinning type fishing reel comprising a rotor, a loop pivotally mounted on said rotor for movement about an axis perpendicular to the axis of said rotor between an open and a closed position, a cam member connected to one end of said loop and pivotally mounted on said rotor, a spring mounted on said rotor and adapted to engage said cam member to yieldably hold said loop in said closed position, and means mounted on said rotor and responsive to movement of said loop from said closed to said open position, to hold said spring out of engagement with said cam member so that said loop may be freely pivoted about said first named axis.

7. A spinning type fishing reel as defined in claim 6 including a housing member rotatably supporting said rotor, a gear sector connected to the other end of said loop and pivotally mounted on said rotor, stationary gear means supported on said housing member and engaging said gear sector when said loop is in said open position, said gear means being adapted to co-operate with said gear sector to move said loop from said open position to said closed position.

8. A spinning type fishing reel comprising a housing member, a rotor mounted on said housing member for rotation relative thereto, a crank carried by said housing member, means operatively connecting said crank to said rotor for rotating it, a loop assembly pivotally mounted on said rotor and including a gear sector, a stationary toothed member disposed in spaced relation to said housing member and adapted to co-operate with said gear sector for moving said loop assembly from said open to said closed position, a tubular shaft supporting said members in spaced relation and having a connection at one end to said housing member and at its other end to said toothed member, one of said connections supporting one of said members for rotation about the axis of said shaft for positioning said crank at the right or left side of the reel, a rod bracket secured to one of said members and adapted to be selectively secured to the other of said members to selectively position said crank at the right or left side of said reel.

9. A spinning type fishing reel as defined in claim 8 wherein said housing member is mounted for rotation about the axis of said shaft and said rod bracket is secured to said gear member.

10. A spinning type fishing reel as defined in claim 6 including a housing member rotatably supporting said rotor, a gear sector connected to the other end of said loop and pivotally mounted on said rotor, a stationary circular gear supported on said housing member and engaging said gear sector when said loop is in said open position, said gear being adapted to co-operate with said gear sector to move said loop from said open position to said closed position, said means comprising a cam plate having a lost motion connection to said cam member such that upon pivotal movement of said loop from the closed to the open position said spring is moved out of engagement with said cam members after said gear sector is moved into engagement with said gear means and upon pivotal movement of said loop from said open position to said closed position said cam plate is moved clear of said spring as the gear sector is moved out of engagement with the stationary gear means.

11. In a spinning type fishing reel including a housing, drive means, and stationary gear means; a rotor operatively connected to said drive means, said rotor carrying a spring and having diametrically opposed trunnions, a loop assembly pivotally mounted on said rotor and comprising a cam adapted to engage said spring and pivotally mounted on one of said trunnions and having a lost motion connection to said cam, said cam plate being effective in one position to hold said spring out of engagement with said cam, a bracket secured to the other end of said loop and pivotally mounted on the other of said trunnions, a gear sector adapted to engage said stationary gear means and pivotally mounted on said other of said trunnions and connected to said bracket for rotation therewith, each of said trunnions having a tapped opening in its outer end, and screws in said tapped openings holding said loop assembly in assembled position on said trunnions.

12. A spinning type fishing reel comprising a stationary first member, a second member rotatably mounted on said first member, a loop assembly pivotally mounted on said second member for movement between an open and a closed position, gear means on said first member, co-operating gear teeth at one end of said loop assembly adapted to engage said gear means for pivoting said loop from said open to said closed position upon rotation of said second member relative to said first member in one direction, and a stop on said second member adapted to engage said loop assembly to limit pivotal movement of said loop assembly at said open and closed positions, said second member having trunnions at opposite sides thereof to which said loop assembly is pivotally connected and said stop being an element having a nonrotative engagement with one of said trunnions and disposed in the path of one of said gear teeth to engage the latter and limit pivotal movement of said loop assembly in one direction.

13. A spinning type fishing reel comprising a spool shaft, a spool mounted on said shaft, a tubular rotor shaft concentric with said spool shaft, a rotor mounted on said rotor shaft, a loop assembly pivotally mounted on said rotor and including a gear sector, a bearing sleeve rotatably mounting said rotor shaft and through which said shafts extend, a housing member having a crank mounted thereon for operating said reel, a gear member engageable with said gear sector for moving said loop assembly from an open position to a closed position, said bearing sleeve interconnecting said housing member and said gear member for rotation relative to each other between first and second positions for positioning said crank for right or left-hand operation, and a rod bracket selectively interconnecting said members in said positions.

14. A spinning type fishing reel comprising a housing, a crankshaft supported on said housing for rotation about its own axis, a spool shaft supported on said housing for movement along its own axis, a cam on said crankshaft and a co-operating U-shaped cam follower on said spool shaft whereby rotation of said crankshaft is effective to reciprocate said spool shaft along its axis, said cam follower including a pair of spaced legs continuously engaging said cam at diametrically opposed points thereon and an interconnecting body portion having an elongated slot extending parallel to the axis of said spool shaft, a portion of said crankshaft extending through said slot and substantially equal in diameter to the width of said slot, said body portion of said follower having a bearing surface extending at right angles to the axis of said crankshaft, and means defining a second bearing surface engaging said bearing surface to prevent rotation of said spool shaft, said last named means comprising a washer received on said crankshaft in concentric relation therewith and means supporting said washer against movement to change the angle between said washer and said crankshaft.

15. A spinning type fishing reel including first and second members, a crank mounted on one of said members, means connecting said members for rotation relative to each other between first and second positions for positioning said crank at the right or left side of said reel and means for selectively securing said members in said positions, said last named means comprising a rod bracket secured to both of said members.

16. A spinning type fishing reel including first and second members, a crank mounted on one of said members, means connecting said members for rotation relative to each other between first and second positions for positioning said crank at the right or left side of said reel and means for selectively securing said members in said positions, said last named means comprising a rod bracket for mounting said reel on an associated rod.

17. A spinning type fishing reel including a crank, a crankshaft carrying said crank, a spool shaft, a housing member into which said crankshaft and said spool shaft extend, a rotor mounted on said spool shaft for rotation thereabout, a line engaging element pivotally mounted on said rotor for movement between operative and inoperative positions, a second member through which said spool shaft extends having means engaging said element upon rotation of said rotor for moving said element from said inoperative position to said operative position, means mounting said members for rotation relative to each other between first and second positions for positioning said crank at the right or left side of said reel, a rod bracket secured to one of said members and adapted to be secured to a fishing rod, and means for selectively securing said members in said first and second positions.

18. A spinning type fishing reel comprising a housing, a crank carried by said housing, stationary gear means disposed in spaced relation to said housing, a tubular bearing shaft interconnecting said housing and said gear means and maintaining said spaced relation, a rotor mounted in said bearing shaft for rotation adjacent said stationary gear means, means in said housing operatively connecting said crank to said rotor, a loop mounted on said rotor and including other gear means adapted to engage said stationary gear means for effecting movement of said loop, said housing being rotatable about the axis of said bearing shaft relative to said stationary gear means between first and second positions for positioning said crank for right or left hand operation, a bracket for mounting said reel on an associated rod, and means for selectively connecting said bracket to selectively interconnect said stationary gear means and said housing for positioning said crank for right or left hand operation, one end of said bracket being secured to said stationary gear means and said last named means comprising means defining an aperture in said bracket spaced from said one end and spaced screws mounted on said housing and selectively operable for extending through said aperture and securing said bracket to said housing for positioning said crank for right or left hand operation.

References Cited in the file of this patent

UNITED STATES PATENTS

| Number | Name | Date |
|---|---|---|
| 146,925 | Marchand | Jan. 25, 1874 |
| 302,925 | Miehling | Aug. 5, 1884 |
| 518,970 | Schultz | May 1, 1894 |
| 563,971 | Kholmeyer | July 14, 1896 |
| 598,253 | McKee | Feb. 1, 1898 |
| 667,659 | Keiper | Feb. 5, 1901 |
| 1,070,240 | Ferrall | Aug. 12, 1913 |
| 1,096,963 | Sweeney | May 19, 1914 |
| 1,187,840 | Illingworth | June 20, 1916 |
| 1,364,259 | Eaton | Jan. 4, 1921 |
| 1,467,250 | Readle | Sept. 4, 1923 |
| 1,587,437 | Sturge | June 1, 1926 |
| 1,699,212 | Smith | Jan. 15, 1929 |
| 1,721,765 | Berge | July 23, 1929 |
| 1,960,285 | Russell | May 29, 1934 |
| 1,976,703 | Vissat | Oct. 9, 1934 |
| 2,158,429 | Sale | May 16, 1939 |
| 2,196,765 | Fries | Apr. 9, 1940 |
| 2,328,613 | Burleith | Sept. 7, 1943 |
| 2,344,209 | Lowe | Mar. 14, 1944 |
| 2,435,374 | Weissman | Feb. 3, 1948 |
| 2,495,621 | Young et al. | Jan. 24, 1950 |
| 2,515,896 | Rakoczy | July 18, 1950 |
| 2,538,584 | Mueller | Jan. 16, 1951 |
| 2,546,465 | Martini | Mar. 27, 1951 |
| 2,615,649 | Flewelling | Oct. 28, 1952 |

FOREIGN PATENTS

| Number | Country | Date |
|---|---|---|
| 819,539 | France | July 12, 1932 |
| 402,080 | Great Britain | Nov. 20, 1933 |
| 418,837 | Great Britain | Nov. 1, 1934 |
| 177,881 | Switzerland | Sept. 2, 1935 |
| 804,230 | France | July 27, 1936 |
| 187,632 | Switzerland | Apr. 16, 1937 |
| 195,577 | Switzerland | Feb. 15, 1938 |
| 483,914 | Great Britain | Apr. 25, 1938 |
| 237,582 | Switzerland | Mar. 15, 1945 |
| 925,931 | France | Apr. 14, 1947 |
| 598,126 | Great Britain | Feb. 11, 1948 |
| 253,557 | Switzerland | Mar. 15, 1948 |

UNITED STATES PATENT OFFICE

CERTIFICATE OF CORRECTION

Patent No. 2,734,693

February 14, 1956

Hector Rabezzana

It is hereby certified that error appears in the printed specification of the above numbered patent requiring correction and that the said Letters Patent should read as corrected below.

Column 1, line 43, for "for" read --from--; column 9, line 30, after the word "position" insert --and--; column 11, line 39, after "trunnions" insert --, a cam plate pivotally mounted on said one of said trunnions--.

Signed and sealed this 17th day of April 1956.

(SEAL)
Attest:

E. J. MURRY

Attesting Officer

ROBERT C. WATSON
Commissioner of Patents